United States Patent
Righi et al.

(10) Patent No.: US 7,363,480 B1
(45) Date of Patent: Apr. 22, 2008

(54) METHOD, SYSTEM, AND COMPUTER-READABLE MEDIUM FOR UPDATING THE FIRMWARE OF A COMPUTING DEVICE VIA A COMMUNICATIONS NETWORK

(75) Inventors: Stefano Righi, Lawrenceville, GA (US); Subramanian Ananthram, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 371 days.

(21) Appl. No.: 11/171,021

(22) Filed: Jun. 30, 2005

(51) Int. Cl.
*G06F 15/16* (2006.01)
*G06F 15/177* (2006.01)

(52) U.S. Cl. .............. 713/1; 713/2; 713/100; 709/219; 709/222; 709/238

(58) Field of Classification Search .......... 713/1, 713/2, 100; 709/219, 222, 238
See application file for complete search history.

(56) References Cited

U.S. PATENT DOCUMENTS

| | | | | |
|---|---|---|---|---|
| 5,948,101 A | * | 9/1999 | David et al. | 713/2 |
| 6,684,327 B1 | * | 1/2004 | Anand et al. | 713/2 |
| 6,810,478 B1 | * | 10/2004 | Anand et al. | 713/2 |
| 6,928,538 B2 | * | 8/2005 | French et al. | 713/1 |
| 7,085,921 B2 | * | 8/2006 | Frye, Jr. | 713/1 |

OTHER PUBLICATIONS

Preboot Execution Environment (PXE) Specification, Version 2.1, Intel Corporation, Sep. 20, 1999.

* cited by examiner

*Primary Examiner*—Abdelmoniem Elamin
(74) *Attorney, Agent, or Firm*—Hope Baldauff Hartman LLC

(57) ABSTRACT

A method for updating the firmware of a computing device via a communications network is provided. A client computer having firmware to be updated boots into a preboot execution environment ("PXE"). A broadcast request is transmitted by the PXE that requests the network location of a server computer operative to provide a firmware update program. The broadcast request also requests the name of the firmware update program. Once the response to the broadcast request is received, the client computer transmits a request to the server computer for the firmware update program. The server computer transmits the firmware update program to the client computer. The client computer then executes the firmware update program in the PXE environment. The firmware update program transmits a request to the server computer for the firmware image file to be used to update the operational firmware, receives the firmware image from the server computer, and updates the operational firmware of the client computer utilizing the received firmware image.

19 Claims, 6 Drawing Sheets

METHOD, SYSTEM, AND COMPUTER-READABLE MEDIUM FOR UPDATING THE FIRMWARE OF A COMPUTING DEVICE VIA A COMMUNICATIONS NETWORK

TECHNICAL FIELD

The present invention is related to the field of updating the operational firmware of computing devices. More particularly, the present invention is related to updating the firmware of a computing device via a communications network.

BACKGROUND OF THE INVENTION

Many computer systems utilize a firmware program stored in a read-only memory to assist with the start up of the computer and to enable communication with the low level hardware of the computer system. For instance, many personal computer systems utilize a basic input/output system ("BIOS") that includes program code containing the basic routines that help to transfer information between elements within the computer. In many computer systems the firmware is stored as groups of memory blocks in one or more re-programmable memory devices. These re-programmable memory devices, typically known as "flash" parts, are a type of non-volatile random access memory ("NVRAM") that allows the firmware BIOS to be recovered or updated by using software to erase and program each flash part. From time to time it is necessary to update the firmware such as, for instance, when a newer version of the firmware becomes available.

Previous methods for updating firmware stored on the flash memory of a computer system typically require a video display and input device connected to the computer to be updated and direct contact with the computer to be updated through the display and input device. In one method, the firmware in previous systems is updated by utilizing an application program that utilizes files containing the updated firmware stored on a local device or available through a serial port connection. In the alternative, a BIOS image update may occur in previous systems through a program provided within the BIOS. While both of these methods for updating the firmware of a computer system work well when a display and/or keyboard are available and when physical access to the computer may be had, headless computers, server computers within server farms, and nodes of a computer cluster are usually without a console and are remotely operated. Accordingly, it can be very difficult and time consuming to update the firmware on computing devices for which local access is not available.

Removing the need to physically operate each computer to update the firmware is especially critical for headless or remote computers that need to be updated without utilizing a display, keyboard, or floppy drive. For instance, manually providing a new BIOS image for each computer in a server farm and/or a large-scale computer cluster can take an excessive amount of time and administrative labor. Furthermore, updates that occur on various network attached computers having different types of firmware become even more complex, potentially requiring a different update procedure for each computer depending on the computer's firmware.

It is with respect to these considerations and others that the embodiments of the present invention have been made.

SUMMARY OF THE INVENTION

In accordance with the present invention, the above and other problems are solved by providing methods, systems, apparatus, and computer-readable media for remotely updating the operational firmware of a computing device via a communications network. Through the embodiments of the invention, the operational firmware for a computing system can be remotely updated without the need for local access to the computing system. Moreover, utilizing the embodiments of the invention, the computing device to be updated need not include a display device, an input device, or even an operating system.

According to one aspect of the invention, a method is provided for updating the operational firmware of a computing device via a communications network. According to the method, the operational firmware of a client computer may be updated through communications with a remote management server computer via a communications network. In particular, the client computer is first configured to boot into a preboot execution environment ("PXE"). The PXE may be provided by a BIOS or by an extensible firmware interface ("EFI") operational environment.

Once the PXE has been initiated, a broadcast request is transmitted from within the PXE. The broadcast request identifies whether the firmware of the client computer is a BIOS firmware or an EFI firmware. The broadcast specifies that the request is from a PXE client by using the DHCP options. According to embodiments, the TFTP server computer is operative to provide a boot program for execution within the PXE environment. In one embodiment, the boot program is a firmware update program that executes within the PXE and that is operative to update the operational firmware of the client computer. It should be appreciated that the PXE server computer and the TFTP server computer may comprise the same computer system. In response to the broadcast request, the PXE server computer returns its network address, the network address of the TFTP server, and the name of the boot program to be utilized by the client computer (i.e. the firmware update program).

Once the response to the broadcast request is received at the client computer, the client computer transmits a request to the TFTP server computer for the firmware update program. The TFTP server computer, in response, transmits the firmware update program to the client computer. The client computer then executes the firmware update program in the PXE environment. As a part of its execution, the firmware update program is operative to transmit a request to the TFTP server computer for a firmware image file to be used to update the operational firmware of the client computer, to receive the firmware image from the server computer, and to update the operational firmware of the client computer utilizing the received firmware image. According to embodiments, the firmware update program may be operative to request from the server computer a configuration file that includes the name of the firmware image. The name of the firmware image contained in the configuration file may be utilized by the client computer to construct the request to the server computer for the appropriate firmware image file.

According to other embodiments of the invention, program code is provided for execution at a server computer for enabling the updating of the operational firmware of a client computer via a communications network. In particular, a server computer is operative to receive a broadcast request from a client computer for the network location of a PXE server computer and a TFTP server computer. The broadcast request may also request the name of a boot program, such as a firmware update program. In response to the request, the server computer transmits the network addresses of the PXE server computer, the TFTP server computer, and the name of the firmware update program. The broadcast request may also indicate whether the firmware of the client computer is a BIOS firmware or an EFI firmware. The proper boot program may be identified based upon whether the client computer is utilizing a BIOS or EFI operational environment.

The server computer may also receive a request from a client computer for the firmware update program. In response to the request, the server computer is operative to transmit the firmware update program. The server computer may also receive a request from the client computer for a configuration file that includes the name of a firmware image for updating the firmware. In response to the request, the server computer may identify the appropriate configuration file based upon a media access control ("MAC") address or a network address associated with the client computer. If a configuration file cannot be located utilizing the MAC address or network address of the client computer, a default configuration file may be identified and transmitted to the client computer. Once identified, the appropriate configuration file is returned to the client computer in response to the request.

Following transmission of the configuration file, the server computer may also receive a request for the firmware image identified in the configuration file from the client computer. In response to the request, the server computer is operative to return the firmware image to the client computer. The firmware update program executing in the PXE of the client computer may then utilize the firmware image to update the operational firmware of the client computer.

The embodiments of the invention may also be implemented as a computer-controlled apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
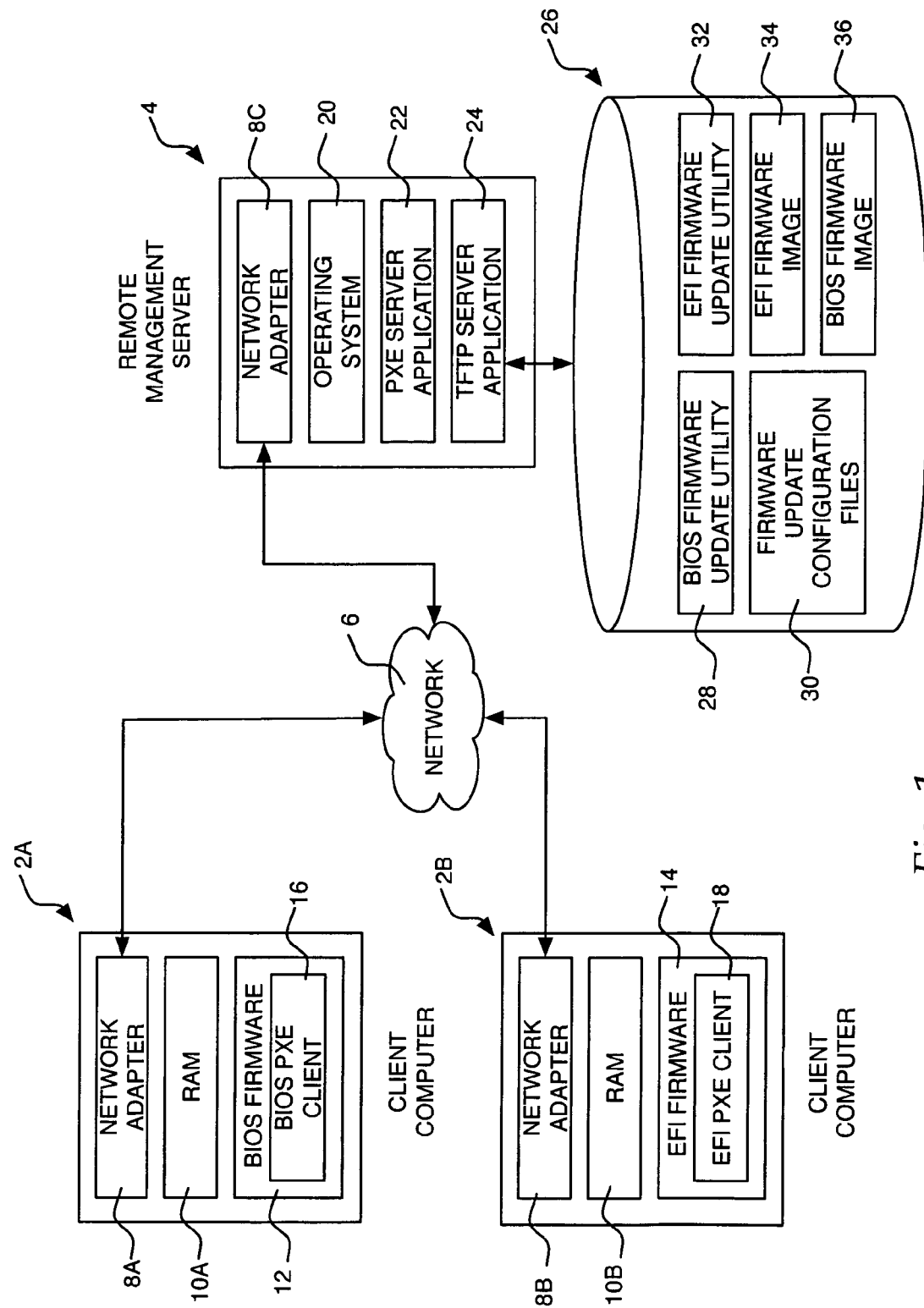
FIG. 1 is a network and computer architecture diagram illustrating aspects of several computer systems utilized in the various embodiments of the present invention.

Embodiments of the present invention provide methods, systems, apparatus, and computer-readable media for updating the firmware of a computing device via a communications network. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the invention may be implemented. While the invention will be described in the general context of program modules that execute in conjunction with an application program that runs on an operating system on a computer system, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, details regarding the operating environment for the various embodiments of the present invention will be provided. As shown in FIG. 1, one or more client computers 2A-2B may be connected to a communications network 6, like a local area network or a wide area network such as the internet. A remote management server computer 4 may also be connected to the communications network 6. In order to establish a functional connection to the network 6, each of the client computers 2A-2B and the remote management server computer 4 may be equipped with a network adapter 8A-8C, respectively. Each of the client computers 2A-2B may also be equipped with a random access memory ("RAM") 10A-10B, respectively, and a read-only memory ("ROM") storing a firmware. The firmware includes program code that assists with the startup of the client computer, that enables communication with and between the hardware components of the client computer, and that performs other functions. For instance, the client computer 2A utilizes a BIOS firmware 12 that provides a BIOS for the operation of the client computer 2A. The client computer 2B includes an EFI firmware 14 that provides an EFI operational environment for the client computer 2B.

Both the BIOS firmware 12 and the EFI firmware 14 include a client for providing a preboot execution environment ("PXE"). In particular, the BIOS firmware 12 includes a BIOS PXE client 16 and the EFI firmware 14 includes and EFI PXE client 18. The PXE clients 16 and 18 provide an environment to bootstrap the client computers using the network adapter independently of available mass storage devices or installed operating systems. For this reason, it is not necessary that the client computers 2A-2B include a mass storage device or an operating system. The PXE is more fully described in the Preboot Execution Environment specification (v2.1) published by INTEL CORPORATION and SYSTEMSOFT, and which is expressly incorporated herein by reference. Additional details regarding the operation of the PXE and the hardware components utilized within the client computers are provided below. It should be appreciated that any number of client computers may be utilized and that two client computers are shown in FIG. 1 for illustrative purposes only.

As shown in FIG. 1, a remote management server computer 4 may also be utilized in embodiments of the invention (also referred to herein as "the server computer"). The server computer 4 is operative to execute an operating system 20 suitable for the operation of a server computer, such as the LINUX operating system or WINDOWS XP from MICROSOFT CORPORATION. The server computer 4 is also operative to execute a PXE server application 22 and a TFTP server application 24. As will be described herein, these two application programs receive and respond to requests from the PXE clients 16 and 18 executing on the client computers 2A-2B. Through these requests and responses, the client computers 2A-2B can update their operational firmware. Additional details regarding this process are described below. It should be appreciated that the PXE server application 22 and TFTP server application 24 may be executed on the same or different computers. These applications are shown in FIG. 1 as being executed by the same server computer for illustration purposes only.

As also shown in FIG. 1, the server computer 4 is operative to maintain a mass storage device 26 for storing application programs and data. In particular, the mass storage device 26 may include a BIOS firmware update utility 28. The BIOS firmware update utility 28 can be executed within the PXE environment provided by the BIOS PXE client 16. As described in greater detail herein, the BIOS firmware update utility 28 is operative to request and receive a BIOS firmware image 36 from the server computer 4. The BIOS firmware update utility 28 utilizes the image 36 to update the firmware 12. In a similar fashion, the mass storage device 26 may include an EFI firmware update utility 32. The EFI firmware update utility 32 can be executed within the PXE environment provided by the EFI PXE client 18. As described in greater detail herein, the EFI firmware update utility 32 is operative to request and receive an EFI firmware image 34 from the server computer 4. The EFI firmware update utility 32 utilizes the image 34 to update the firmware 14. Additional details regarding this process are described below.

According to embodiments of the invention, the server 4 may maintain one or more firmware update configuration files 30. In particular, configuration files may be created that associate the media access control ("MAC") address or network address of a client computer with a particular firmware image. In this manner, the appropriate firmware image for use with any client computer can be identified by the server 4. In a similar vein, the client computers may indicate to the server computers whether they are utilizing a BIOS firmware or an EFI firmware. Based upon this data, the server computer 4 may determine the appropriate update utility to transmit to the client computer. Additional details regarding this process are discussed below with respect to FIGS. 2A-2B.

Figure 2A:
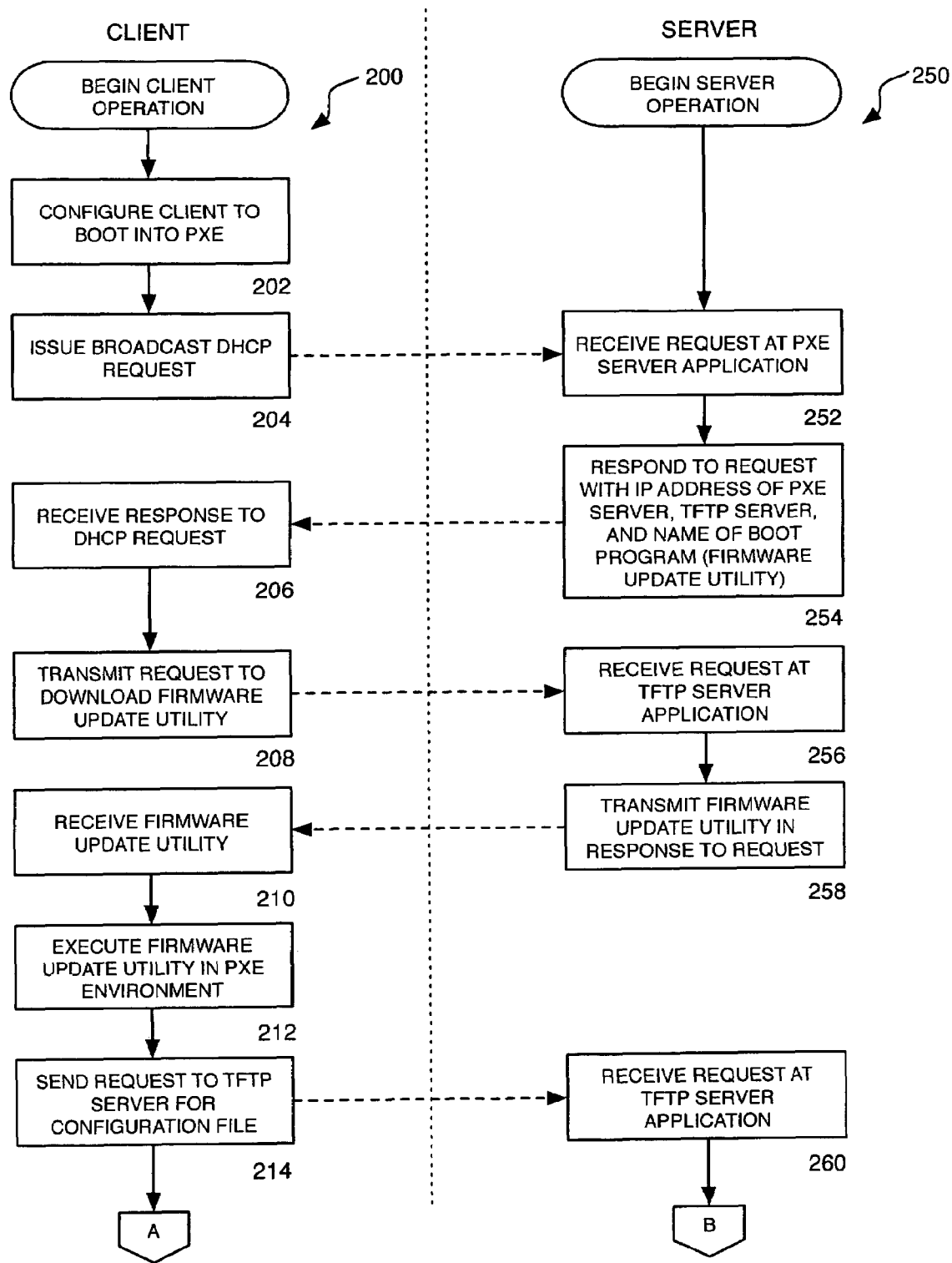
FIGS. 2A-2B are flow diagrams illustrating processes performed by a client computer and a remote management server computer provided in various embodiments of the invention.
Figure 2B:
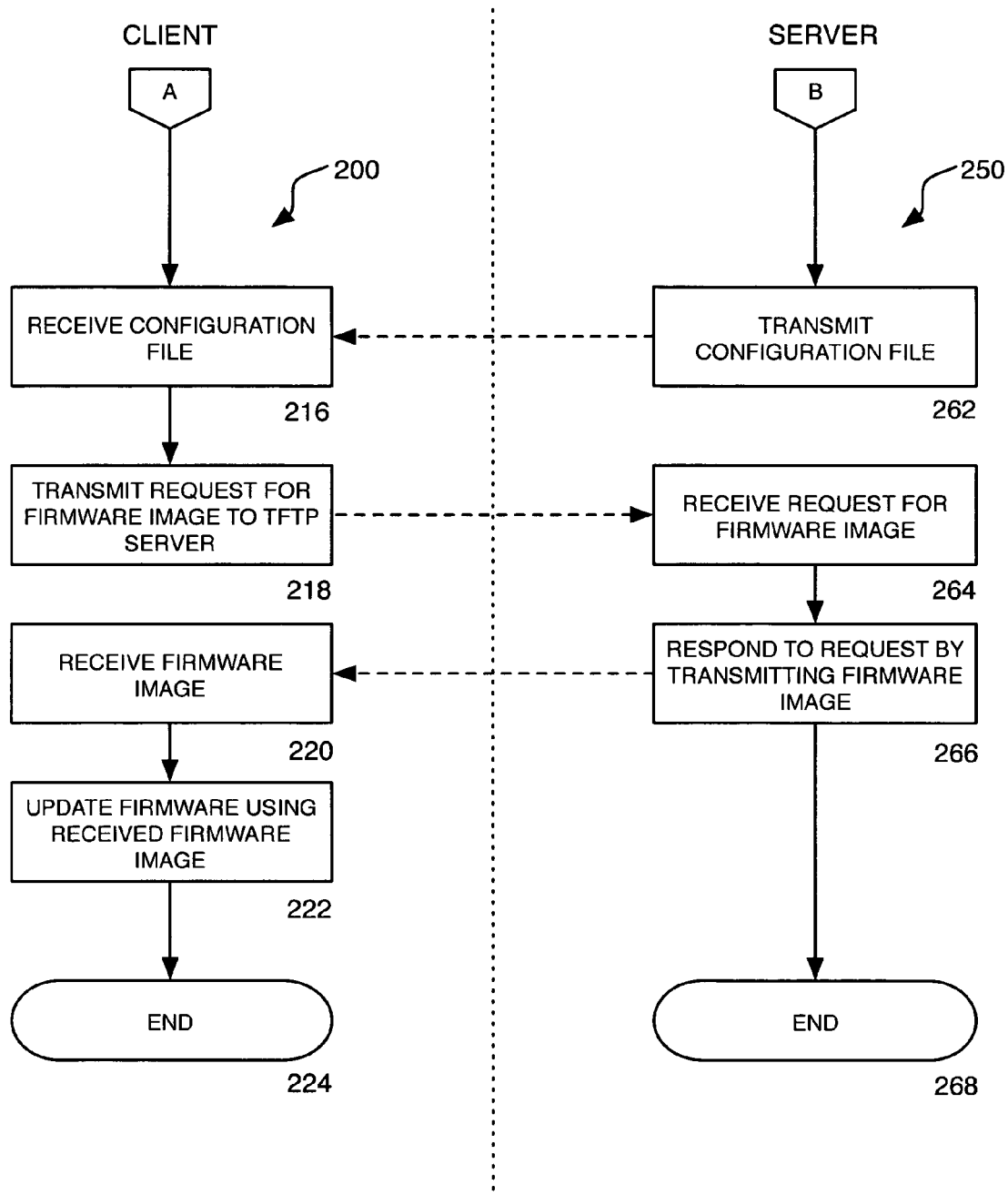

Turning now to FIGS. 2A-2B, several illustrative routines 200 and 250 will be described illustrating the operation of a client computer and a remote management server 4, respectively, for updating the operational firmware of the client computer. It should be appreciated that, according to the embodiments of the invention, the software described herein has been implemented as software instructions executing on a general purpose microprocessor. Alternatively, however, the software operations described herein may be performed by a dedicated hardware circuit, by program code executing on a specific purpose microprocessor, such as a microcontroller, or through some other combination of hardware and software.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIGS. 2A-2B making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 200 begins at operation 202 where the client computer 2 is configured to boot into the PXE at startup. The client computer 2 may be configured to boot into PXE by the server 4 or through a local interaction with the client computer 2. The routine 200 then continues to operation 204, where the PXE issues a broadcast dynamic host configuration protocol ("DHCP") request. The request includes a request for the network address of the server computer executing the PXE server application 22, the network address of the server computer executing the TFTP server application 24, and a request for the name of the program to be booted in the PXE environment. The request may also include data indicating whether the client computer is utilizing a BIOS or an EFI firmware.

The server computer 4 receives the broadcast request at operation 252. From operation 252, the server computer 4 responds to the request with the appropriate network addresses. The server computer 4 also identifies the appropriate boot program based upon whether the requesting client computer is utilizing a BIOS firmware or an EFI firmware. If a BIOS firmware is being utilized, the PXE boot program is the BIOS firmware update utility 28. If an EFI firmware is being utilized, the PXE boot program is the EFI firmware update utility 32. The name of the appropriate boot program to be utilized by the requesting client computer is transmitted to the client computer at operation 254.

At operation 206, the client computer receives the response to the broadcast DHCP request. The routine 200 then continues to operation 208, where the client computer transmits a request to the server computer 4 to download the identified firmware update utility. This request is received at the server computer 4 at operation 256 and the requested firmware update utility is transmitted to the client compute at operation 258. At operation 210, the client computer receives the firmware update utility from the server computer 4.

From operation 210, the routine 200 continues to operation 212, where the firmware update utility is executed in the PXE. If the BIOS firmware update utility 28 is utilized, it is executed in the PXE provided by the BIOS PXE client 16. If the EFI firmware update utility is utilized, it is executed in the PXE provided by the EFI PXE client 18. From operation 212, the routine 200 continues to operation 214.

At operation 214, the firmware update utility transmits to the server computer a request for the appropriate configuration file 30 identifying the name of the firmware image to utilize. The server computer 4 receives the request from the client computer 2 at operation 260. As described above, the server computer 4 may utilize the MAC address or network address of the requesting client computer to identify the appropriate configuration file 30. If a configuration file cannot be identified that corresponds to the MAC address or network address of the requesting client computer, a default configuration file may be identified and utilized. The identified configuration file is transmitted to the requesting client computer at operation 262.

At operation 216, the client computer receives the configuration file. Based on the contents of the configuration file, the client computer constructs and transmits a request to the server computer for the appropriate firmware image file. This occurs at operation 218. The server computer receives the request at operation 264 and responds to the request at operation 266 by transmitting the requested firmware image file. For instance, if the client computer requests the EFI firmware image 34, the server computer 4 transmits this image file to the client computer at operation 266.

At operation 220, the firmware update utility receives the firmware image from the server computer 4. The routine 200 then continues to operation 222 where the firmware update utility updates the firmware of the client computer utilizing the received firmware image file. The routine 200 then continues to operation 224, where it ends.

Figure 3:
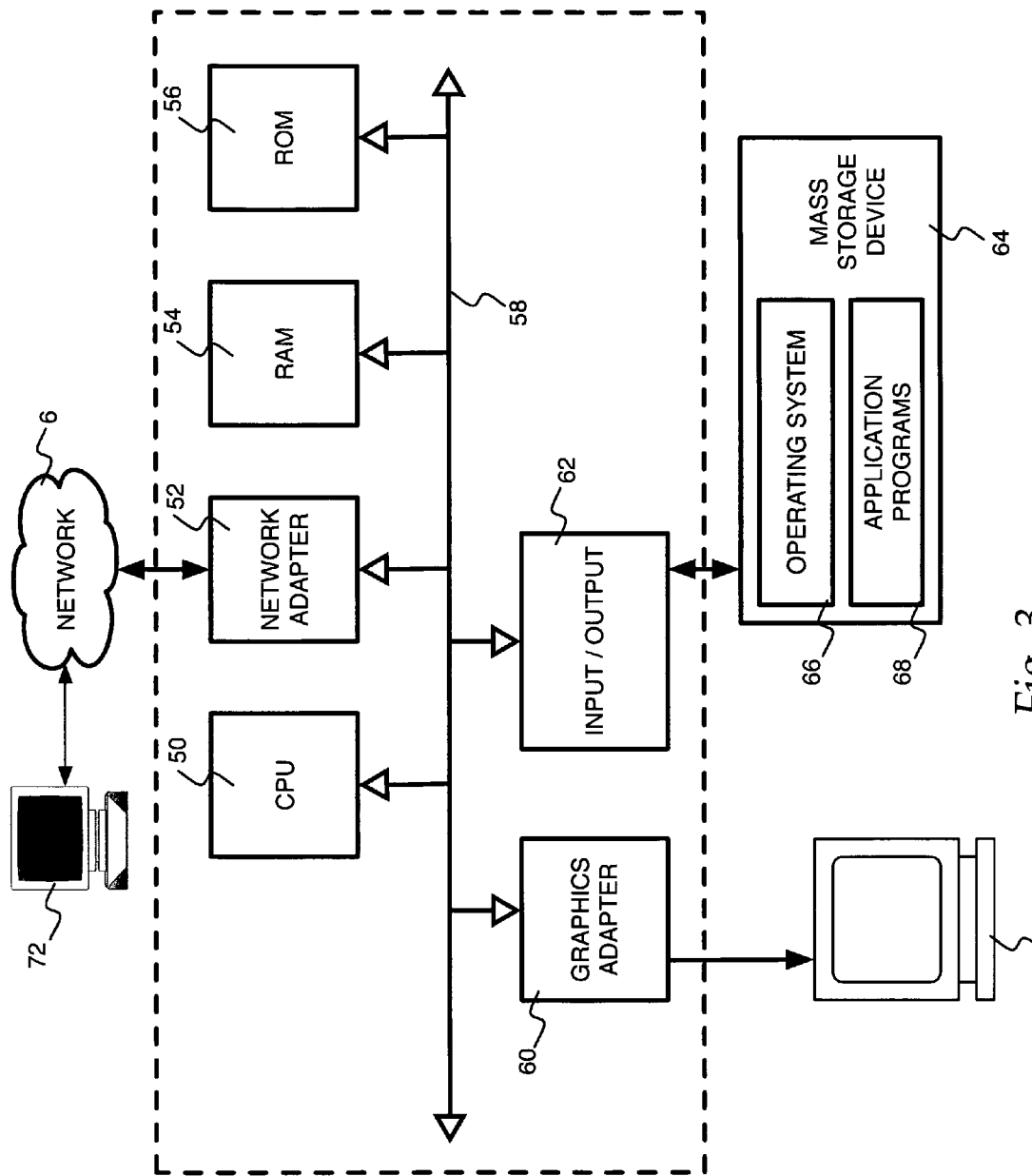
FIG. 3 is a computer architecture diagram showing an illustrative hardware architecture for computer systems utilized in the embodiments of the invention.

Turning now to FIG. 3, an illustrative computer architecture for practicing the various embodiments of the invention will now be described. In particular, FIG. 3 illustrates an exemplary computer architecture for a client computer 2 or a remote management server 4 provided according to embodiments of the invention. The computer architecture shown in FIG. 3 includes a baseboard, or "motherboard", which is a printed circuit board to which a multitude of components or devices may be connected by way of a system bus 58 or other electrical communication path. In one illustrative embodiment, these components include, without limitation, a central processing unit ("CPU") 50, a network adapter 52, a system memory, and an input/output module 62. It is also contemplated that the computer architecture shown in FIG. 3 may include other components that are not explicitly shown.

The system bus 58 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus 58. Buses and the associated functionality of master-slave communications are well-known to those skilled in the art, and therefore not discussed in further detail herein.

The system memory utilized in the computer architecture shown in FIG. 3 may include including a random access memory ("RAM") 54 and a read-only memory ("ROM") 56. The ROM 56 may store a firmware comprising a basic input/output system that includes program code containing the basic routines that help to transfer information between elements within the computer. As described in greater detail herein, the firmware may alternately comprise an extensible firmware interface ("EFI") operating environment. The network adapter 52 may be capable of connecting the computer to a remote 72 via the network 6. Connections which may be made by the network adapter 52 may include local area network ("LAN") or wide area network ("WAN") connections. LAN and WAN networking environments are commonplace in offices, enterprise-wide computer networks, intranets, and the Internet.

The CPU 50 is a standard central processor that performs arithmetic and logical operations necessary for the operation of the computer. CPUs are well-known in the art, and therefore not described in further detail herein. The input/output module 62 is used as a communication medium between any number and type of peripheral devices and the system bus 58. Communications destined for the CPU 50 or any other component coupled to the system bus 58 and issued by a peripheral device must therefore pass through the input/output module 62 to the system bus 58 and then to the necessary component.

As shown in FIG. 3, the input/output module 62 is connected a mass storage device 64 for storing an operating system 66 and application programs 68. The operating system 66 comprises a set of programs that control operations of the computer and allocation of resources. The set of programs, inclusive of certain utility programs, also provide a graphical user interface to the user. An application program is software that runs on top of the operating system software and uses computer resources made available through the operating system to perform application specific tasks desired by the user. As described herein, the client computer 2 provided herein need not have an operating system 66 installed.

The mass storage device 64 and its associated computer-readable media, provide non-volatile storage for the computer. Although the description of computer-readable media contained herein refers to a mass storage device, such as a hard disk or CD-ROM drive, it should be appreciated by those skilled in the art that computer-readable media can be any available media that can be accessed by the computer. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A graphics adapter 60 may also be utilized that enables the display of video data (i.e., text and/or graphics) on a display unit 70. It will be appreciated that the video graphics adapter may process analog signals (i.e., VGA) or digital signals (i.e., DVI) for display on a compatible display unit. The video graphics adapter 60 includes a video buffer for temporarily storing one or more lines of video data to be displayed on the display unit 70. According to embodiments of the invention, the client computer 2 is not equipped with a graphics adapter 60 or a display unit 70.

The computer architecture illustrated in FIG. 3 may further include a hardware keyboard and mouse connected to an input/output module for controlling keyboard and mouse functions of the computer. According to embodiments of the invention, however, the client computer 2 is not equipped with a keyboard or mouse pointing device. It should also be appreciated that other types of computing architectures and computing devices may be utilized to practice the invention. For instance, the client computer 2 may comprise a hand-held computer, embedded computer system, personal digital assistant, or other type of computing device known to those skilled in the art.

Figure 4:
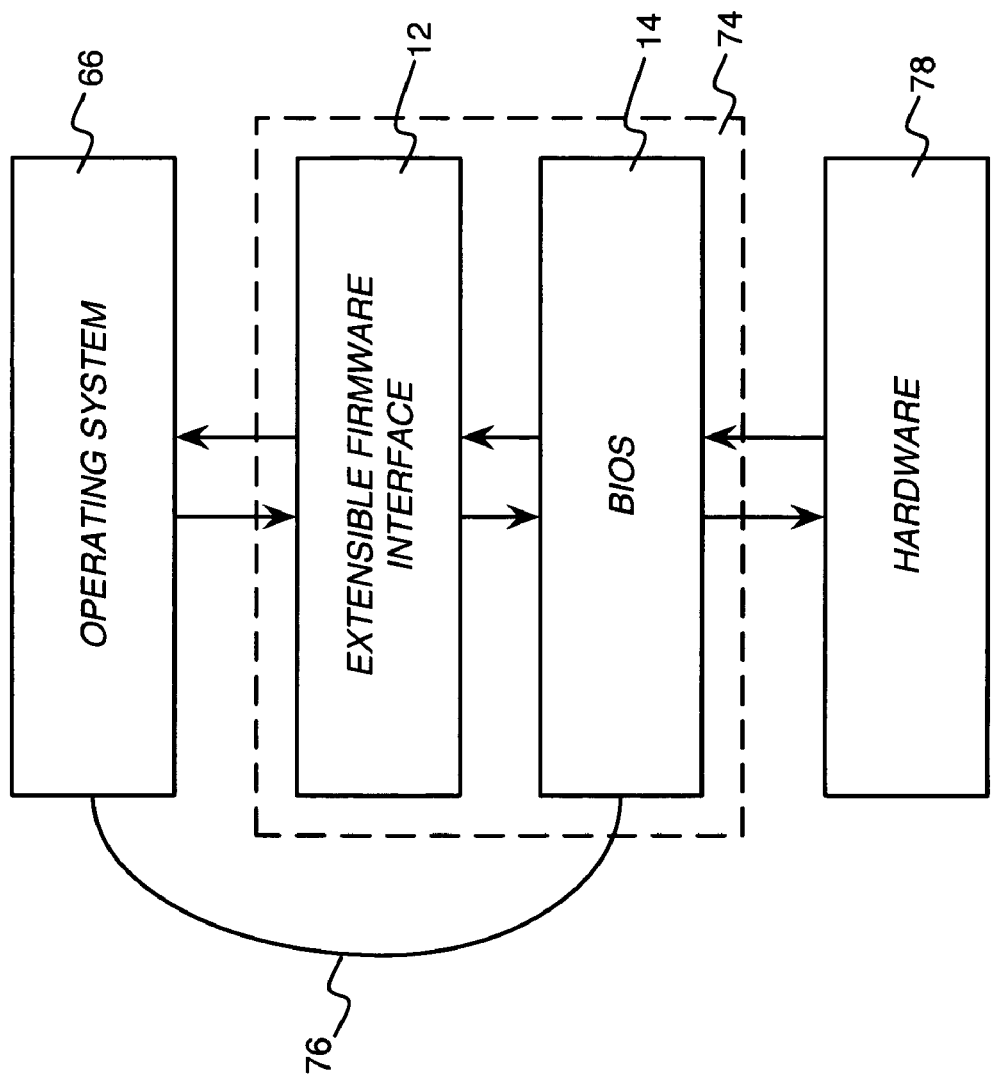
FIGS. 4-5 are computer architecture diagrams illustrating additional details regarding an extensible firmware interface firmware utilized in embodiments of the present invention.

Referring now to FIG. 4, additional details regarding the operation of the firmware of the client computer will be described. According to embodiments of the invention, the firmware 12 may comprise a computer basic input output system ("BIOS"). As known to those skilled in the art, the BIOS of a PC-compatible computer provides an interface between the operating system 66 and the hardware 78 of the computer 2. Alternatively, the firmware may comprise a firmware 14 compatible with the EFI specification ver. 1.1 from INTEL CORPORATION. The EFI specification describes an interface between the operating system 66 and the system firmware 74. The EFI specification defines the interface that platform firmware must implement, and the interface that the operating system 66 may use in booting. How the firmware 74 implements the interface is left up to the manufacturer of the firmware. The intent of the specification is to define a way for the operating system 66 and firmware 74 to communicate only information necessary to support the operating system boot process. This is accomplished through a formal and complete abstract specification of the software-visible interface presented to the operating system by the platform and the firmware.

According to one implementation of EFI on INTEL CORPORATION IA-32 platforms, both the EFI 12 and a BIOS 14 may be presented in the firmware 74. This allows users and system integrators to support both firmware interfaces. In order to provide this functionality, an interface 76 may be provided for use by legacy operating systems and applications. Additional details regarding the architecture and operation of the EFI 12 are provided below with respect to FIG. 5. Moreover, additional details regarding the operation and architecture of EFI can be found in the EFI specification which is available from INTEL CORPORATION end expressly incorporated herein by reference. It should be appreciated that the firmware may include only a BIOS-compatible firmware or only an EFI-compatible firmware.

Figure 5:
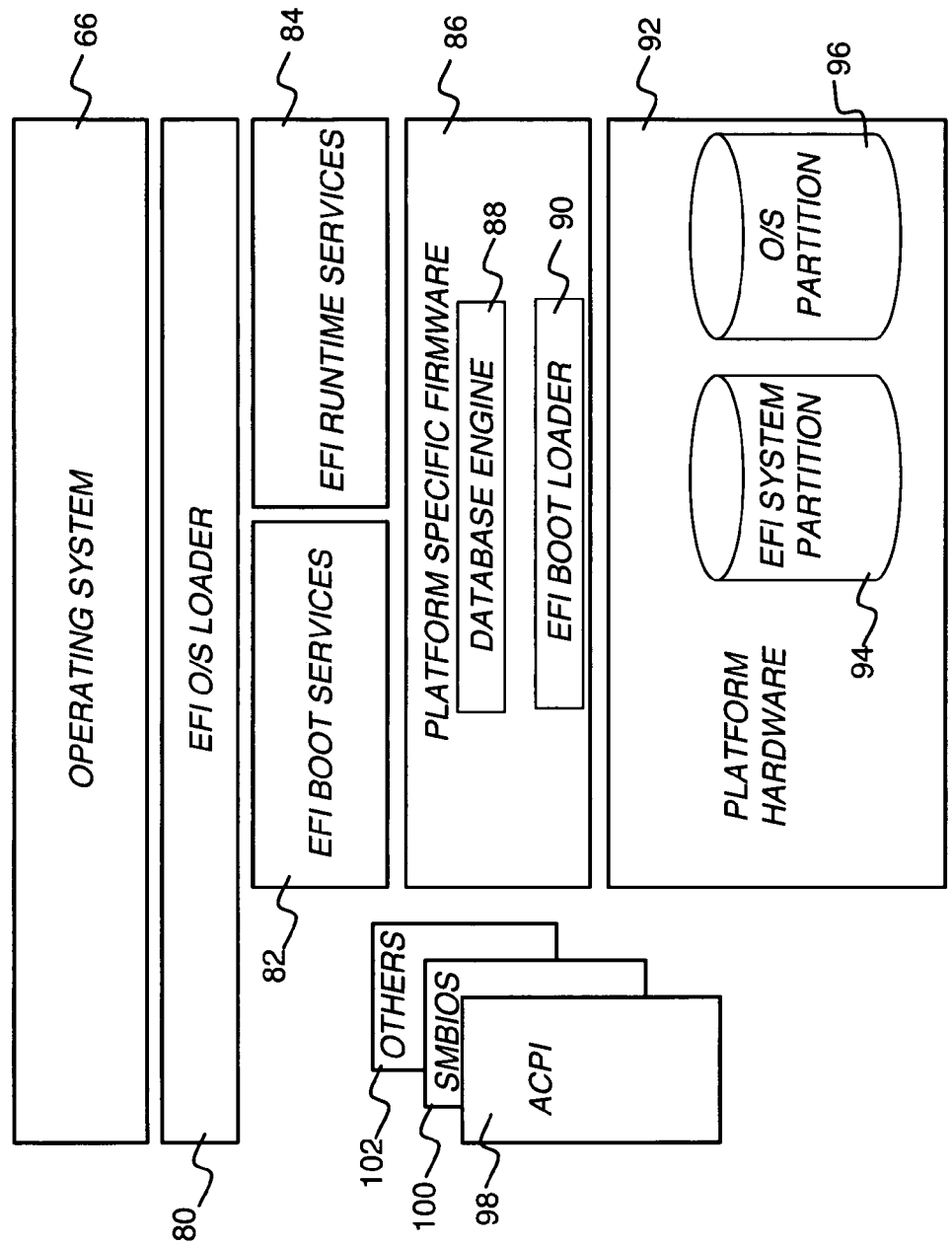

Turning now to FIG. 5, additional details regarding an EFI specification-compliant system utilized to provide an operating environment for the various embodiments of the invention will be described. As shown in FIG. 5, the system includes platform hardware 92 and an operating system 66. The platform firmware 86 may retrieve an OS image from the EFI system partition 92 using an EFI O/S loader 80. The EFI system partition 92 may be an architecturally shareable system partition. As such, the EFI system partition 94 defines a partition and file system that are designed to allow safe sharing of mass storage between multiple vendors. An O/S partition 96 may also be utilized.

Once started, the EFI O/S loader 80 continues to boot the complete operating system 66. In doing so, the EFI O/S loader 80 may use EFI boot services 82 and interface to other supported specifications to survey, comprehend, and initialize the various platform components and the operating system software that manages them. Thus, interfaces 98, 100, and 102, from other specifications may also be present on the system. For example, the Advanced Configuration and Power Management Interface ("ACPI") and the System Management BIOS ("SMBIOS") specifications may be supported.

EFI boot services 82 provides interfaces for devices and system functionality that can be used during boot time. EFI runtime services 84 may also be available to the O/S loader 80 during the boot phase. For example, a minimal set of runtime services may be presented to ensure appropriate abstraction of base platform hardware resources that may be needed by the operating system 66 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 90 at system boot time. The EFI boot loader 90 is a component in the EFI firmware that determines which program modules should be explicitly loaded and when. Once the EFI firmware is initialized, it passes control to the boot loader 90. The boot loader 90 is then responsible for determining which of the program modules to load and in what order.

The various program modules executing within the EFI may have a need to store data in an easy to access and manage manner. Because the various program modules may utilize data of virtually any data type, there is also a need to store data of any arbitrary data type. The database engine 88 executes within the EFI and provides these services to other program modules executing within the EFI. The database engine 88 may be provided as a part of the EFI core or as a separate EFI driver. In particular, program modules executing within the EFI can utilize the database engine 4881 to index stored data in a database. Records can be added to the database, removed from the database, and the database may be searched. Other types of database functions may also be performed on the records stored by the database engine 88.

Based on the foregoing, it should be appreciated that embodiments of the present invention provide methods, systems, apparatus, and computer-readable medium for updating the firmware of a computing device via a communications network. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of updating the operational firmware of a computing device via a communications network, the method comprising:

transmitting from within a preboot execution environment a broadcast request for the network location of a server computer operative to provide a firmware update program for updating the firmware and for the name of the firmware update program;

indicating in the request whether to update basic input/output system (BIOS) firmware or to update extensible firmware interface (EFI) firmware;

receiving a response to the request including the network location of the server computer and the name of the firmware update program, wherein the firmware update program is for updating BIOS firmware or EFI firmware;

transmitting a request to the server computer for the firmware update program;

receiving the firmware update program from the server computer in response to the request; and executing the firmware update program within the preboot execution environment, wherein executing the firmware update program comprises transmitting a request to the server computer for a firmware image, receiving the firmware image from the server computer in response to the request, and updating the operational firmware of the computing device utilizing the received firmware image.

2. The method of claim 1, wherein the preboot execution environment is provided by a basic input/output system.

3. The method of claim 2, wherein the firmware update program is operative to execute within the preboot execution environment provided by the basic input/output system.

4. The method of claim 1, wherein the preboot execution environment is provided by an extensible firmware interface operational environment.

5. The method of claim 4, wherein the firmware update program is operative to execute within the preboot execution environment provided by the extensible firmware interface operational environment.

6. The method of claim 1, wherein executing the firmware update program further comprises transmitting a request to the server computer for a configuration file including the name of the firmware image, receiving the configuration file from the server computer, and constructing the request to the server computer for the firmware image based on the contents of the configuration file.

7. A computer-readable storage medium having computer-executable instructions stored thereon which, when executed by a computer, cause the computer to perform the method of claim 1.

8. A method for updating the operational firmware of a computing device via a communications network, the method comprising:

receiving a broadcast request for the network location of a server computer operative to provide a firmware update program for updating the firmware from within a preboot execution environment and for the name of the firmware update program, wherein the request indicates whether to update basic input/output system (BIOS) firmware or to update extensible firmware interface (EFI) firmware;

transmitting the network location of the server computer and the name of the firmware update program in response to receiving the broadcast request;

receiving a request for the firmware update program; and transmitting the firmware update program in response to the request.

9. The method of claim 8, further comprising:

receiving a request for a configuration file including the name of a firmware image for updating the firmware;

identifying the configuration file based upon data associated with the computer requesting the configuration file; and transmitting the identified configuration file in response to the request.

10. The method of claim 9, wherein identifying the configuration file based upon data associated with the computer requesting the configuration file comprises:

determining if a configuration file exists corresponding to a MAC address for the computer requesting the configuration file; and identifying the configuration file corresponding to the MAC address of the computer requesting the configuration file if a configuration file exists corresponding to a MAC address for the computer requesting the configuration file.

11. The method of claim 10, wherein identifying the configuration file based upon data associated with the computer requesting the configuration file further comprises:

determining if a configuration file exists corresponding to a network address for the computer requesting the configuration file; and identifying the configuration file corresponding to the network address of the computer requesting the configuration file if a configuration file exists corresponding to a network address for the computer requesting the configuration file.

12. The method of claim 11, wherein identifying the configuration file based upon data associated with the computer requesting the configuration file further comprises utilizing a default configuration file if no configuration file exists corresponding to the MAC or network address of the computer requesting the configuration file.

13. The method of claim 9, further comprising:

receiving a request for the firmware image identified in the configuration file; and transmitting the firmware image in response to the request.

14. A computer-readable storage medium having computer-executable instructions stored thereon which, when executed by a computer, cause the computer to perform the method of claim 8.

15. A system for updating the operational firmware of a computing device via a communications network, the system comprising:

a client computer operative to transmit from within a preboot execution environment a broadcast request for the network location of a server computer operative to provide a firmware update program for updating the firmware and for the name of the firmware update program, to indicate in the request whether to update basic input/output system (BIOS) firmware or to update extensible firmware interface (EFI) firmware, to receive a response to the request including the identity of the server computer and the name of the firmware update program, to transmit a request to the server computer for the firmware update program, to receive the firmware update program from the server computer in response to the request, and to execute the firmware update program within the preboot execution environment, wherein executing the firmware update program comprises transmitting a request to the server computer for a firmware image, receiving the firmware image from the server computer in response to the request, and updating the operational firmware of the computing device utilizing the received firmware image; and a server computer operative to receive the broadcast request from the client computer, wherein the request indicates whether to update BIOS firmware or EFI firmware, to transmit to the client computer the network location of the server computer and the name of the firmware update program in response to receiving the broadcast request, to receive a request for the firmware update program, to transmit the firmware update program to the client computer in response to the request, to receive the request for the firmware image from the client computer, and to transmit the firmware image in response to the request.

16. The system of claim 15, wherein the preboot execution environment is provided by a basic input/output system.

17. The system of claim 15, wherein the firmware update program is operative to execute within the preboot execution environment provided by the basic input/output system.

18. The system of claim 15, wherein the preboot execution environment is provided by an extensible firmware interface operational environment.

19. The system of claim 15, wherein the firmware update program is operative to execute within the preboot execution environment provided by the extensible firmware interface operational environment.

* * * * *

UNITED STATES PATENT AND TRADEMARK OFFICE
CERTIFICATE OF CORRECTION

| | | |
|---|---|---|
| PATENT NO. | : 7,363,480 B1 | |
| APPLICATION NO. | : 11/171021 | |
| DATED | : April 22, 2008 | |
| INVENTOR(S) | : Stefano Righi and Subramanian Ananthram | |

It is certified that error appears in the above-identified patent and that said Letters Patent is hereby corrected as shown below:

In the Drawings

In Fig. 4 of the drawings, the reference numerals 12 and 14 should be reversed, so that reference numeral 14 designates the block labeled "Extensible Firmware Interface", and the reference numeral 12 designates the block labeled "BIOS".

Column 7
Line 64, the word "including" should be deleted.

Column 8
Line 25, insert the word -- to -- after the word connection.

Column 9
Line 25, insert the word -- the -- between the words "that" and "platform".

Lines 35 through 49 should read:
-- According to one implementation of EFI on INTEL CORPORATION IA-32 platforms, both the EFI ~~12~~ 14 and a BIOS ~~14~~ 12 may be presented in the firmware 74. This allows users and system integrators to support both firmware interfaces. In order to provide this functionality, an interface 76 may be provided for use by legacy operating systems and applications. Additional details regarding the architecture and operation of the EFI ~~12~~ 14 are provided below with respect to FIG. 5. Moreover, additional details regarding the operation and architecture of EFI can be found in the EFI specification which is available from INTEL CORPORATION ~~end~~ and expressly incorporated herein by reference. It should be appreciated that the firmware may include only a BIOS-compatible firmware or only an EFI-compatible firmware. --.

UNITED STATES PATENT AND TRADEMARK OFFICE
CERTIFICATE OF CORRECTION

PATENT NO. : 7,363,480 B1
APPLICATION NO. : 11/171021
DATED : April 22, 2008
INVENTOR(S) : Stefano Righi and Subramanian Ananthram It is certified that error appears in the above-identified patent and that said Letters Patent is hereby corrected as shown below:

Column 9
Lines 55 through 61 should read
-- The platform firmware 86 may retrieve an OS image from the EFI system partition 92 94 using an EFI O/S loader 80. The EFI system partition 92 94 may be an architecturally shareable system partition. As such the EFI system partition 94 defines a partition and file system that are designed to allow safe sharing of mass storage between multiple vendors. An O/S partition 96 may also be utilized. --.

Column 10
Line 34, reference numeral "4881" should read -- 88 --.

Signed and Sealed this

Fifteenth Day of December, 2009

David J. Kappos
*Director of the United States Patent and Trademark Office*